Nov. 22, 1966 W. B. CRANE, JR 3,286,835
DISPLAY PACKAGE AND METHOD OF MAKING THE SAME
Filed June 19, 1964 4 Sheets-Sheet 1

INVENTOR.
WILLIAM B. CRANE, JR.
BY
Mandeville and Schweitzer
ATTORNEYS

Nov. 22, 1966  W. B. CRANE, JR  3,286,835
DISPLAY PACKAGE AND METHOD OF MAKING THE SAME
Filed June 19, 1964  4 Sheets-Sheet 2

INVENTOR.
WILLIAM B. CRANE, JR.
BY
*Mandeville and Schweitzer*
ATTORNEYS

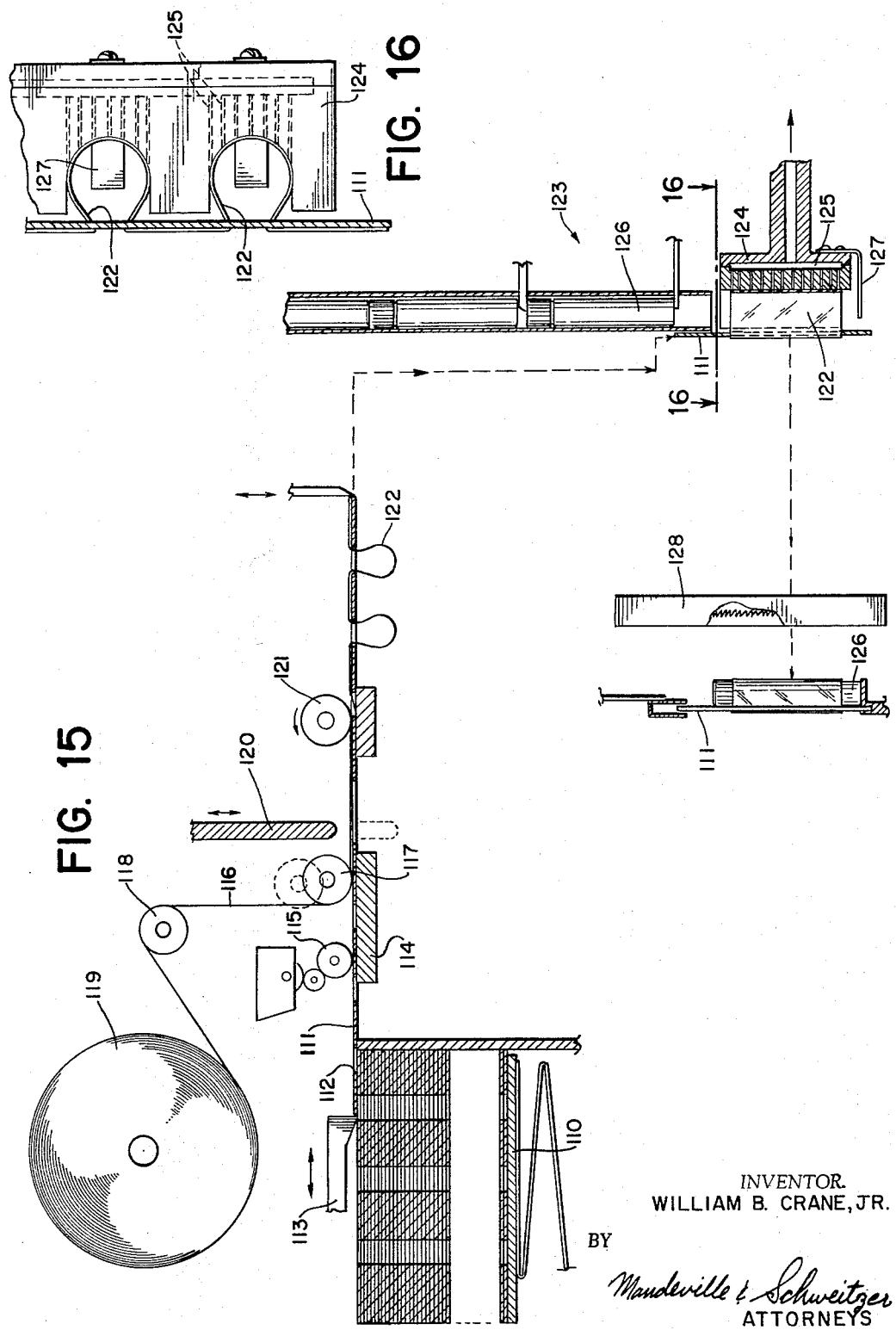

Nov. 22, 1966   W. B. CRANE, JR   3,286,835
DISPLAY PACKAGE AND METHOD OF MAKING THE SAME
Filed June 19, 1964   4 Sheets-Sheet 4
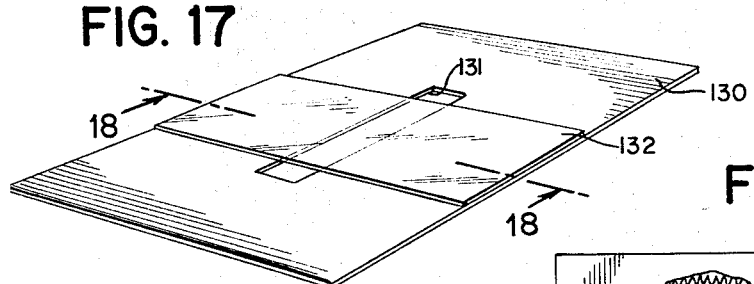
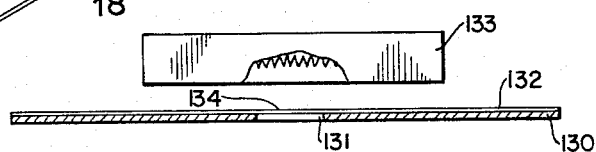
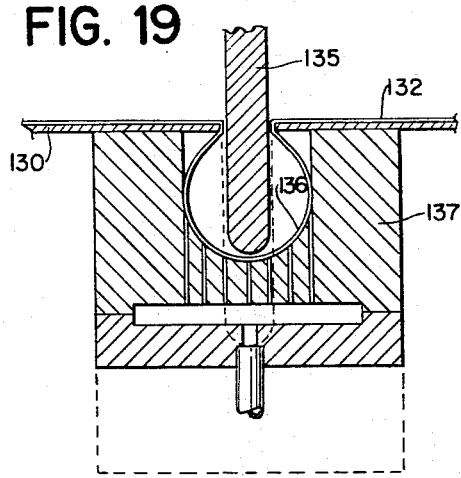
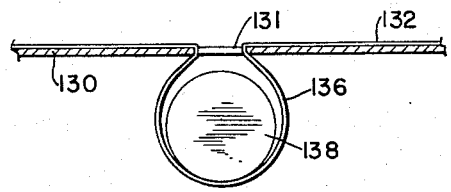
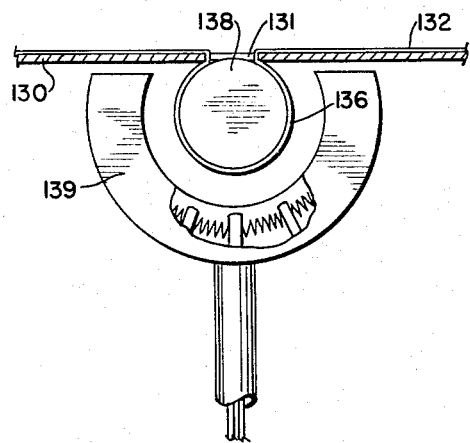
INVENTOR.
WILLIAM B. CRANE, JR.
BY
Mandeville and Schweitzer
ATTORNEYS United States Patent Office 3,286,835
Patented Nov. 22, 1966

3,286,835
DISPLAY PACKAGE AND METHOD OF
MAKING THE SAME
William B. Crane, Jr., New York, N.Y., assignor to
United Shoe Machinery Corporation, Flemington, N.J.,
and Boston, Mass., a corporation of New Jersey
Filed June 19, 1964, Ser. No. 376,430
30 Claims. (Cl. 206—80)

The present invention relates to the art of display packaging, and is directed more specifically to a novel and improved shrink-film display package, in which an article is supported on a display card in a novel manner, by means of a heat-shrunk section of thermoplastic film.

In my prior United States Patent No. 3,018,879 there is disclosed and claimed a shrink-film package, in which a sheet of thermoplastic film is anchored to the back of a display card and a pocket of the film is formed to extend through an opening in the card. A display product is inserted through the opening, from the back of the card, reoriented to a position in which it cannot freely pass back through the opening, and secured in such reoriented position by shrinkage of the film pocket by heat. The subject matter of the present invention represents a significant departure from the invention of my beforementioned prior patent in that, among other things, a heat-shrinkable thermoplastic film and an apertured display card are arranged in such manner that a section of the film passes through the card opening and forms an open-ended, article-embracing loop. A display article may be inserted lengthwise into the open-ended loop from the front of the card and secured in a desired display position by subsequent shrinkage of the article-embracing loop upon its exposure to heat.

As one of the more specific aspects of the invention, a new and improved display package of the generally described type is provided in which the article-embracing film loop is formed of part of a web or strip of thermoplastic film, which is adhered to the back of the display card from one edge to the other, passing over a product positioning opening in the card. The width of the film strip advantageously is slightly less than the corresponding dimension of the display card opening (which will hereinafter be considered as the length dimension of the opening) so that a portion of the film strip may be projected through the opening to form the desired open-ended loop. The strip of thermoplastic film used in forming the article-embracing loop is most advantageously previously "tensilized" or stretched under heat in its lengthwise dimension. Accordingly, when the article-embracing loop subsequently is exposed to heat, it will shrink substantially in length, while undergoing no substantial change in width. In other instances, it may be desirable to utilize non-tensilized thermoplastic film, which is adhered to the back of the display card in flat condition, or at least with a loop of smaller dimensions than desired. Subsequently, the film is stretched in the area of the card opening to form a tensilized loop-forming portion.

The packaging concept of the present invention is particularly advantageous in that it is readily adaptable to modern, high-speed, automated packaging procedures. Thus, the display cards themselves are susceptible of high-speed continuous manufacture in individual or multiple form, utilizing substantially continuous roll supplies of thermoplastic film and sheet or roll supplies of cards, as may be desired. The prepared display cards may thus be supplied to the packager in a ready-to-be-filled condition and may be fed into automatic filling equipment for insertion of the display product and heat shrinking of the article-embracing loop into taut condition about the article. In connection with the product loading stage, it is particularly significant that the product may be inserted lengthwise, along the front of the display card, into its proper support position without any substantial reorientation or other complicated manipulation. This enables the produce to be fed by gravity or other conventional loading techniques in a substantially foolproof manner and at high rates of production.

In addition to the foregoing, the packaging concept of the present invention is particularly versatile as regards the type of product suitable for display and as regards the various manners in which a given product may be displayed. By way of example only, it may be desirable to display a lipstick case in a manner to permit the case to be opened for inspection of the color of the lipstick, and in such a case the heat-shrunk, article-embracing loop will engage the product only in selected areas, permitting manual access to other areas. On the other hand, it may be desirable to prevent undetected opening of other types of containers, in which event the loop-forming film strip may be provided with a width slightly greater than the length of the display products so that, upon shrinking of the loop, overhanging portions thereof partly close over the ends of the product.

For a better understanding of the invention and a more thorough consideration of its various forms and its various advantages, reference should be made to the following detailed specification and to the accompanying drawing, in which.

Figure 14:
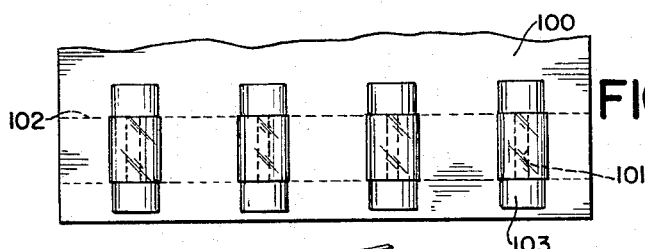

FIG. 14. is a fragmentary elevational view of a multiple display package incorporating the principles of the invention and intended for use in connection with the simultaneous display of a large number of like articles;

FIG. 15 is a highly simplified schematic illustration of the sequence of steps involved in the preparation of a display package and the packaging of a display article in accordance with the invention;

FIG. 16 is an enlarged, cross-sectional view taken generally along line 16—16 of FIG. 15;

FIG. 17 is a perspective view of a further modified form of display package according to the invention, utilizing nontensilized thermoplastic film; and FIGS. 18–21 are sequential views illustrating significant steps involved in the preparation of a packaged display article utilizing the display package of FIG. 17.

Figure 1:
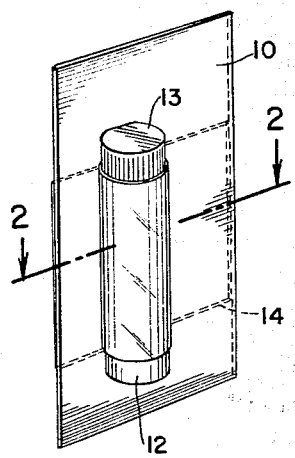
FIG. 1 is a perspective view of a first form of the new display package, illustrating an advantageous way of mounting a capped bottle, for example, in a way to prevent undetected removal of the cap.
Figure 2:
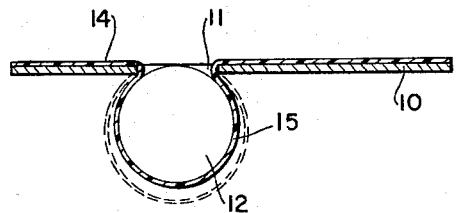
FIG. 2 is a cross-sectional view, taken along line 2—2 of FIG. 1.

Referring now to the drawing, and initially to FIGS. 1 and 2, the reference numeral 10 designates a display card, which may be formed of suitable paperboard or similar material such as typically utilized in connection with display cards of conventional construction. In accordance with the invention, the display card 10 is provided with an opening 11, which may be considered as a product positioning opening, which has its size and shape determined by the nature of the display product and the way in which the product is to be presented for display, as will be hereinafter explained. In the first illustrated form of the invention, shown in FIGS. 1 and 2, the display product is a generally cylindrical container 12 having a cap 13, and the product positioning opening has a length substantially equal to that of the container and cap and a width substantially less (e.g., ⅔) than the diameter of the container. The arrangement in this illustrative example is such, as shown in FIG. 2, that the product projects at least partly into the card opening 11 and, in appropriate cases, somewhat beyond the back surface of the card.

In accordance with the invention, there is adhered to the back surface of the card 10 a section 14 of thermoplastic film. Advantageously, the film section is in strip form, as indicated in FIG. 1, and extends from one edge to the other across the back of the card, as shown in FIG. 2. Advantageously, the width of the film strip is less than the length of the product positioning opening 11, and the strip is aligned between the ends of the opening, so that a loop-forming portion 15 of the film may be projected through the card opening 11 to form an opening ended loop.

As indicated in FIG. 2, the film strip 14 is adhered to the back of the display card from one side edge of the card to an edge of the opening 11, and then again from the other edge of the opening across to the other edge extremity of the card, this adherence being advantageously brought about by application of an adhesive strip of appropriate width across the back of the card by means of conventional equipment.

In some instances, it may be desirable or appropriate that the width of the film strip 14 be slightly in excess of the length of the product positioning opening. However, the film width should not be so much greater as to prevent the loop-forming portion 15 of the film from being projected through the opening to form an open-ended loop. Further, in such a case, provision should be made to prevent application of adhesive across the end areas of the card opening, to make certain that the film does not become adhered thereto.

Although it is contemplated that a variety of heat-shrinkable thermoplastic films may be suitable for the purpose, an especially satisfactory film material is a clear, transparent polyvinyl chloride type film of about 1 mil thickness. A specifically desirable, commercially available product is Vitafilm ST, manufactured by Goodyear. In accordance with one aspect of the invention, the film is provided in a "tensilized" condition; that is, the film is in a stretched condition in a lengthwise direction, such that, upon exposure to heat, the film will tend to shrink back to its initial or relaxed condition. Typically, the extent of such shrinkage tendency will be about 40 percent of the initial tensilized length. Although the tensilized film is greatly preferred, because of its substantially unidirectional shrinkage, it may be appropriate for certain applications to utilize biaxially stretched film; in the latter instance, it would be necessary to provide for and perhaps take advantage of widthwise shrinkage, which is substantially absent in connection with the use of tensilized film.

In accordance with the invention, the open-ended film loop 15 is formed to have an initial circumferential length (indicated in broken lines in FIG. 2) somewhat greater (advantageously around 10 to 15 percent) than the maximum cross-sectional dimension of the product. At an appropriate loading station, to be described, the product, such as the container 12 is inserted lengthwise along the front of the display card 10 and into an open end of the enlarged film loop. When the product reaches the desired position relative to the face of the card, which may be determined by the shape and size of the product positioning opening 11, by suitable tab stops on the display card, or by appropriate stops on the loading equipment, sufficient heat is applied to the film loop to cause it to shrink about and tightly embrace the product. In this connection, the initial dimensions of the film loop are such, relative to the dimensions of the product in the region to be embraced in the final display package, that the heat-induced shrinkage of the film loop usually about 40 percent maximum) is sufficient to bring the film into a heat-shrunk-taut condition around the product.

In the modification illustrated in FIGS. 1 and 2, the heat-shrunk film loop 15 draws the container 12 tightly into the card opening 11, so that the container is held against axial displacement by the end edges of the opening and is also supported firmly by the longitudinal side edges of the opening. Also, where desired and as indicated in FIG. 1, one end edge area of the film loop may overlap the container cap 13, in a way to prevent undetected opening thereof.

Figure 3:
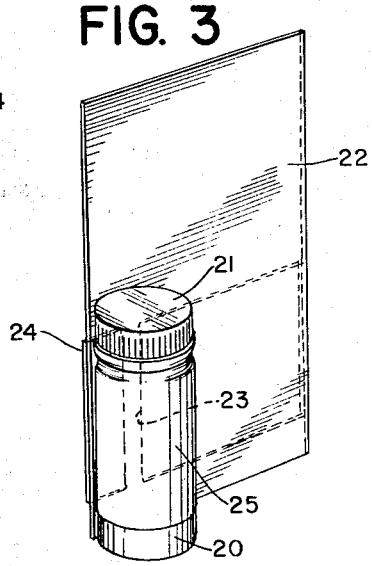
FIGS. 3 and 4 are perspective and side elevational views respectively of a modified form of the new display package, forming a self-standing package for the display of a capped bottle, for example, in a manner providing for maximum advertising space on the display card.
Figure 4:
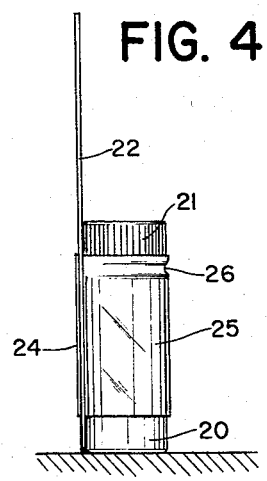

In the modification of FIGS. 3 and 4, a bottle or similar container 20 having a suitable cap 21 is secured to a display card 22 in the manner generally deescribed in connection with FIGS. 1 and 2, except that the size and shape of the product positioning opening 23 is such that the display product does not enter the opening but is supported against the front surface of the display card. Advantageously, the display product is supported in a lower corner extremity of the display card to afford a maximum uninterrupted card area for advertising and other information.

In the modification of FIGS. 3 and 4, the strip 24 of tensilized thermoplastic film is adhered completely across the back of the display card from one side edge to the other, with a loop-forming portion 25 being projected through the card opening 23. The location of the card opening 23, with respect to the side edge of the card, is such that, when the product is centered over the opening, the side edge of the display product may substantially coincide with the side edge of the card. In addition, the intended longitudinal positioning of the display product is such that the bottom surface of the product coincides with the bottom edge of the card, whereby the finished display package will be self-standing, as indicated in FIG. 4.

In the modifications of FIGS. 3 and 4, the longitudinal position of the generally cylindrical container 20 and cap 21 is fixed by reason of an annular groove 26, formed in the neck of the bottle, and which is positioned between the end extremities of the film loop 25. Thus, when the film loop is brought into heat-shrunk-taut condition about the display product, a portion of the film shrinks into the annular groove 26 to fix the article against longitudinal displacement.

Figure 5:
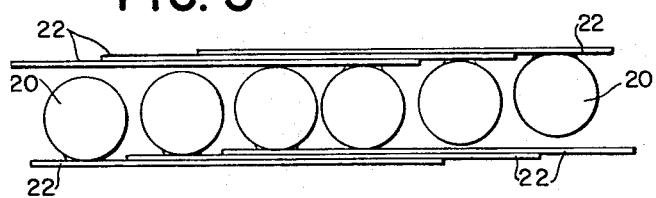
FIG. 5 is an elevational view illustrating the manner in which a large plurality of display packages according to FIG. 3 may be nested for shipment.

One of the particular advantages of the completed display package of FIGS. 3 and 4 resides in the fact that maximum use of space is provided for advertising and other printed displays. In addition, the configuration of the package of FIGS. 3 and 4 is such as to accommodate nesting of a large number of packages in a minimum of space for shipment from the packager, for example. This advantageous feature is illustrated in FIG. 5, which illustrates the nesting of a half-dozen shipment of packaged articles. By arranging three packages in shingle fashion facing upward and three more in shingle fashion and facing downward, the entire half-dozen shipment may be nested in a space not significantly larger than the cubic requirements of a single display package.

Figure 7:
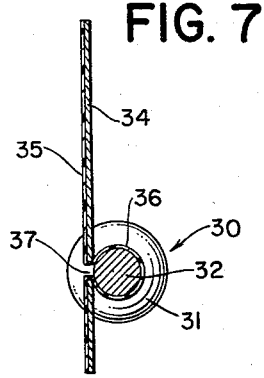
FIG. 7 is a cross-sectional view taken along line 7—7 of FIG. 6.
Figure 6:
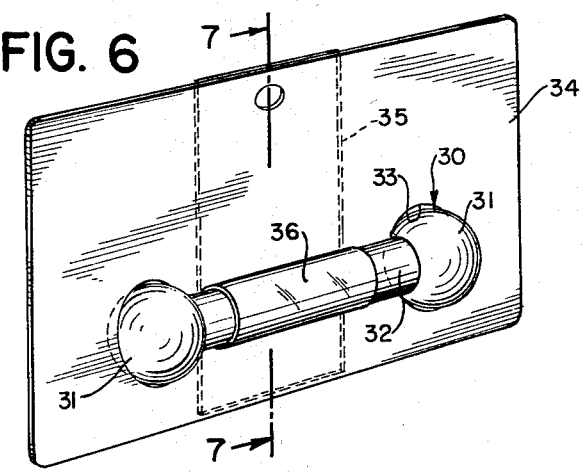
FIG. 6 is a perspective view of a further modified display package according to the invention, adapted particularly for the display of an article having an irregular cross-section.

In the modified form of the invention illustrated in FIGS. 6 and 7, provision is made for packaging of an article having an irregular cross-section, particularly as regards cross-sectional enlargement of one or more of the end regions of the product relative to center regions to be embraced by the loop-forming portion of the film. For purposes of illustration only, the product 30 shown in FIGS. 6 and 7 has a general configuration of a bar bell, with enlarged ends 31 and a smaller, cylindrical midsection 32. For packaging articles of this type, it is advantageous to provide recess openings 33 appropriate to receive the enlarged end portions and to enable the midsection 32 to be received flat against the surface of the display card 34.

In the package of FIGS. 6 and 7, a strip 35 of heat-shrinkable thermoplastic extends from the top edge to the bottom edge of the display card and has a loop-forming portion 36 which extends through a product positioning opening 37 in the card. The width of the film strip 35 is less than the length of the midsection 32 of the product, and the opening 37 terminates in spaced relation to the recess openings 33.

In the initial or tensilized condition of the loop-forming film section 36, the loop dimensions are such as to accommodate the endwise insertion of the enlarged end sections 31 of the display article 30, to a position in which the ends are received in the recess openings 33 and the midsection 32 is loosely embraced by the film loop. Thereafter, the film loop is brought into heat-shrunk-taut condition, as illustrated in FIG. 7, to secure the product firmly to the display card.

In connection with the embodiment of FIGS. 6 and 7, it will be understood that, without the provision of the recess openings 33 over the enlarged ends of the display article, the display card might be caused to buckle in its center area, as the loop-forming portion 36 of the film is tightened up by heat shrinkage. This condition is avoided by so designing the display card as to bring the film-embracing portion of the display product into direct contact with the display card, at least along the longitudinal edges of the product positioning opening. If, in some products of unusual configuration, this proves to be impossible or impractical, it is possible and may in some cases be advantageous to premount the desired display product by suitable means on a plastic or paperboard channel of U-shaped cross-section. The combined channel and product forms the article which is embraced by the loop-forming portion of the heat-shrinkable film.

Figure 8:
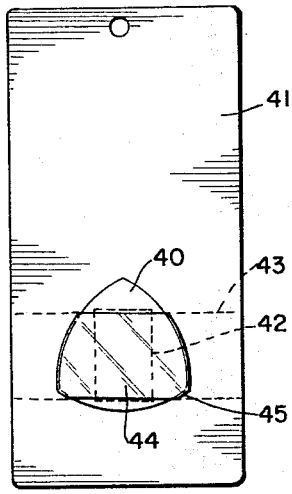
FIG. 8 is a front plan view of a further modified form of display package according to the invention, illustrating an advantageous manner of packaging a flat article, such as a compact.

In the modification of FIG. 8, a large, flat article, such as a compact 40, is secured to a suitable display card 41. The display card 41 is provided with a product positioning opening 42, advantageously of a size and shape to be wholly concealed behind the display article 40, and a heat-shrinkable thermoplastic film strip 43 is adhered from edge to edge across the back of the display card with a loop-forming portion 44 being projected through the opening 42 and embracing the display article. Advantageously, the display article has a non-uniform configuration from end to end, including at least one surface reversal, and the product is so positioned relative to the film loop 44 that the surface reversal, indicated at 45 in FIG. 8, lies between the ends of the loop. Thereafter, when the loop is brought into a heat-shrunk-taut condition, the product is locked against endwise movement by reason of the conformation of the heat-shrunk film to the surface reversal area of the product.

It should be particularly pointed out that the card opening 42, in the modification of FIG. 8 and other modifications (such as those of FIGS. 3–7), does in fact perform a product positioning function, even though little of any part of the product physically projects through the opening. The taut portions of the film loop, acting against the opposed side edges of the opening serve to position the product laterally on the display card in the desired manner.

Figure 9:
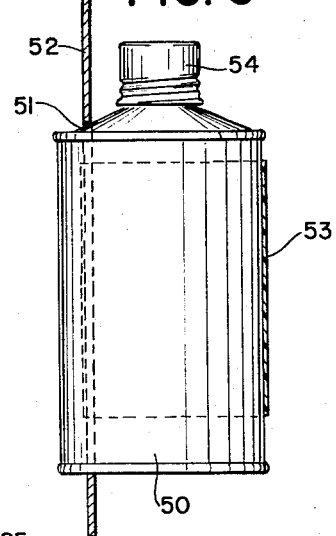
FIG. 9 is a vertical cross-sectional view of a form of display package incorporating the invention, illustrating an advantageous manner of displaying a product such as an aerosol can.

In the modification of FIG. 9, a display article, such as a can 50, is received in a product positioning opening 51 in a display card 52, the opening being of such a size and shape relative to the can that a substantial portion of the can projects beyond the back surface of the card. A thermoplastic film 53, having a product-embracing loop in a heat-shrunk-taut condition, secures the can snugly against the display card in accordance with principles previously described. In the illustrated arrangement, the top 54 of the can is readily accessible and removable for inspection of odor, color, etc.

Figure 10:
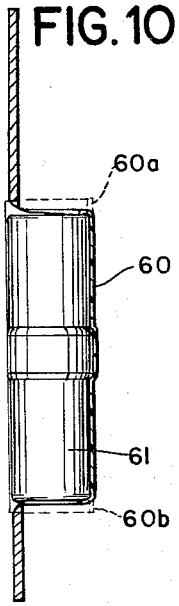
FIGS. 10 and 11 are vertical cross-sectional views of additional modifications of display packages according to the invention, illustrating advantageous arrangements for displaying articles, such as lipstick cases, for example.

In the modification of FIG. 10, the width of the thermoplastic film strip 60 is somewhat greater than the length of the display article 61, so that end portions 60a, 60b of the film (shown in broken lines) initially overhang the ends of the display article. When the loop-forming portion of the film subsequently is brought into a heat-shrunk-taut condition, the initially overhanging end portions are shrunk tightly over end surface areas of the display article, in the manner illustrated in FIG. 10. This serves not only to retain the display article in a predetermined axial position, but also to substantially inhibit pilferage of the item from the display card.

Figure 11:
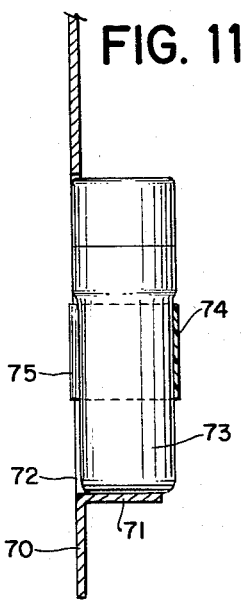

In the modification of FIG. 11, a display card 70 is provided with an outwardly extending stop tab 71 at one end of the product positioning opening 72. The display article 73, which is held in position by a heat-shrunk-taut, loop-forming portion 74 of a thermoplastic film strip 75, is positioned on the card by abutment at one end with the stop tab 71. The use of the stop tab may be particularly useful for properly positioning the display article during the product loading stage, as will be understood.

Figure 12:
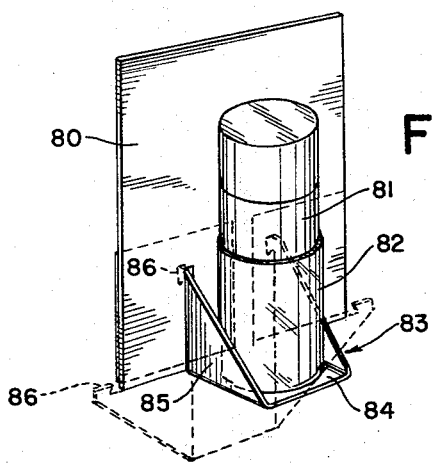
FIG. 12 is a perspective view of a further modified form of display package according to the invention, arranged to stand up on a counter, for example, without external support and providing for removal and replacement of a container cover.

In the embodiment of FIG. 12, there is shown a self-standing display package comprising a display card 80, a display article 81 secured to the card by a heat-shrunk-taut loop of a thermoplastic film 82, and an integral foot bracket 83. The foot bracket 83 comprises a bottom forming panel 84 hinged to the bottom edge of the display card, and a pair of bracing panels 85 hinged to the side edges of the bottom forming panel 84. The bracing panels have small locking tabs 86, which are received in appropriate openings in the display card, to lock the bottom forming panel in right angular, forwardly projecting relation to the principal plane of the display card. The bottom forming panel surface serves as a positioning stop for the display article as well as a foot to support the display package in self-standing relation.

Figure 13:
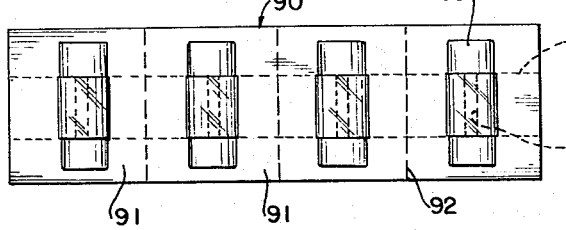
FIG. 13 is a plan view of a multiple display card arrangement to facilitate handling during production and loading with individual display cards being supported therefrom as a final production procedure.

In FIG. 13, there is illustrated an advantageous form of multiple display card 90 comprising a plurality of separable, individual display packages 91. The multiple display package is formed using a multiple display card blank, which may be provided with appropriate dividing scores or lines 92, and has a plurality of individual card openings 93. In the preparation of the multiple display card, a single continuous length of thermoplastic film 94, advantageously tensilized throughout, is adhered along the back of the entire multiple card blank, with appropriate loop-forming portions being projected through the individual card openings 93. The multiple card is then loaded with a plurality of display articles 95, substantially as indicated in FIG. 13, after which the multiple card is cut or otherwise separated along the parting lines 92.

In the modification of FIG. 14, a multiple display card assembly is shown which may be similar to that of FIG. 13, except that there is no provision for separation into individual display packages, each containing a display article. Thus, in the modification of FIG. 14, a single card blank 100 contains one or more rows of product positioning openings 101, and thermoplastic strips 102 are appropriately adhered along the back of the card along each row of openings 101, with open-ended, article-embracing loops of the film being projected through each of the openings to receive a display product 103. As used in its intended manner, the multiple display package of FIG. 14 is set up on appropriate display and the articles 103 are removed individually therefrom as required, until the entire display card is exhausted.

In FIGS. 15 and 16 there is illustrated a highly simplified and schematic system which can be employed to advantage in the production of display packages according to the invention. By way of illustrative example, there is shown a supply stack 110 of separable multiple display card blanks 111, each including three product positioning openings 112. In the illustrated system, the topmost blank is advanced by a pusher 113 over a platen 114 and beneath a suitable adhesive applicator roller 115. The applicator roller is alined in a predetermined manner with the product positioning openings 112 and is arranged to apply adhesive in a strip approximately equal to the width of a strip of tensilized thermoplastic film 116 and within the end limits of the openings.

The display card blank 111 is advanced stepwise by suitable feeding means (not specifically illustrated) such that in a first feeding stage the blank passes under the glue applicator roller 115 and partly underneath a pressure roller 117 which guides the film 116 and presses it against the adhesively coated blank. The blank advances underneath the pressure roller 117 until a point at which the film 116, being drawn over a guide roller 118 from a supply roll 119, is adhered from its leading edge up to the side edge of the first product positioning opening. Thereafter, the pressure roller 117 is raised substantially above the blank, to a position as indicated in broken lines in FIG. 15, and the blank is advanced stepwise until the first product positioning opening directly underlies a festooning bar 120.

In the advanced position of the blank, at least the leading edge portion thereof underlies a one-way clutch roller 121, which is mounted to have frictinoal engagement with the blank and for rotation only in the direction of advancement of the blank, as indicated by the small arrow. At this stage, the festooning bar 120 is projected downward through the product receiving opening of the blank, carrying with it a loop-forming portion of the thermoplastic film. In this respect, the action of the festooning bar 120 is such as to tend simultaneously to draw film from the supply roll 119 and to draw backward on the blank, the latter action being prevented, however, by the one-way rotation of the clutch roller 121.

By projecting the festooning bar 120 a predetermined distance (advantageously adjustable) beyond the front (lower) face of the card blank, a loop-forming film portion of predetermined dimensions is formed, whereupon the roller 117 is lowered onto the card blank 111, to again bring the film 116 into adhesive contact with the back of the card. The festooning bar 120 has now withdrawn to a position above the card blank and the blank is advanced stepwise to adhere the film to the blank in the area between adjacent product positioning openings.

As will be understood, the above recited procedure is carried out repetitively by suitable timed apparatus, so that multiple display cars are successively formed, each consisting of a plurality of individual, separable display cards having a thermoplastic film adhered across the back from one side edge to the other and having a predetermined, heat-shrinkable, loop-forming portion 122. At this time or at a subsequent time the multiple cards may be cut or otherwise separated into their individual sections.

While it is contemplated that the entire manufacturing procedure, from the multiple card blanks and film supply as starting materials to finished display packages, may be carried out at a single location, practical economical considerations render it more likely that the operations involved in preparing single or multiple unloaded display cards will be carried out by a central display card supplier while the product loading and other operations leading to a finished display package will be carried out typically by the product manufacturer. In any event, the completed but unloaded display cards, in individual form if desired but more advantageously in multiple form prior to separation, are conveyed past a loading station indicated generally by the reference numeral 123. The loading station advantageously includes vacuum forms 124 positioned to embrace the film loops 122 when the display card is in a loading position. The vacuum forms are contoured to fully open the film loops 122 to appropriate cross-sectional configurations to accommodate endwise loading, and appropriate vacuum passages 125 are provided to draw the film into contact with the contoured walls of the forms.

When the film loops are fully opened, as shown in FIG. 16, the display articles 126 are loaded endwise into the open-ended loops, advantageously by a suitable gravity operated system, but by other automatic means, or even manually if desired. Suitable stop means 127 are provided to limit the extent of endwise movement of the display article into the onpen-ended film loop.

After loading into the vacuum-opened loops, the loaded display cards are advanced to a heating station, where suitable heaters 128 act upon the heat-shrinkable film loop portions 122 to bring them into heat-shrunk-taut condition, securing the display article tightly to the supporting card.

As will be understood, the procedures illustrated in FIG. 15 may be highly automated, or partly or entirely manual, as circumstances warrant. Special equipment for the production of display articles according to the invention is the subject of other of my inventions.

In the modification shown in FIGS. 17–21, a suitable display card 130, having a product positioning opening 131, has a strip 132 of thermoplastic film adhered in flat relation across its back surface and directly across the opening 131. In accordance with this aspect of the invention, the film strip 132 is non-tensilized as applied to the back of the display card and is subsequently distended while in a heated condition, to provide the desired heat-shrinkable, product-embracing loop.

As indicated in FIG. 18, the display card 130 with the adhered flat film 132 is exposed to a heater 133 acting particularly on that area of the film, designated by the reference numeral 134, which bridges over the card opening 131. While the bridging film section 134 is in a heat-softened condition, a festooning bar, indicated at 135 in FIG. 19, is projected through the card opening from the back, a distance sufficient to distend the heated film portion 134 to form a tensilized film loop 136 of desired dimensions. Thereafter, and after the film loop has cooled and set in its distended condition, the festooning bar 135 may be partically or wholly withdrawn and a vacuum form 137 may be brought into embracing relation with the film loop, as indicated in FIG. 19.

After complete withdrawal of the festooning bar 135 and while the loop remains fully opened by the vacuum form 137, the display product 138 is inserted endwise into the open-ended film loop, substantially in the manner heretofore described with respect to FIGS. 1–16, the distended or tensilized film loop 136 being advantageously 10 to 15 percent larger than necessary to tightly embrace the display article. Subsequently, the distended loop 136 is subject to the action of a heater 139, as indicated in FIG. 21, to bring the film loop 136 into heat-shrunk-taut relation, holding the display article 138 tightly against the display card 130. The finished product illustrated in FIG. 21 differs from the product of FIGS. 1 and 2, for example, in that the film sections adhered to the back of the display card are non-tensilized. It will be understood, however, that the adhered sections of the film are not required to be tensilized, since only the loop-forming portions of the film are heat-shrunk into tightly embracing relation with the display article.

The modification of FIGS. 17–21 may have special advantages in connection with display articles of unusual shape, where it may be desirable to distend some portions of the film loop to a different extent than others prior to heat-shrinking the loop about the display article. The nature and extent of the distention should not, however, be such as to exceed the "memory" limits of the film beyond which the stretched film may not shrink reliably and effectively upon subsequent exposure to heat.

The present invention, in any of its various forms, provides a new and improved display package which, in addition to having many desirable characteristics in its finished form, is particularly adaptable to and suitable for modern automated high-speed packaging machinery. Thus, in the initial preparation of the display cards, thermoplastic film may be fed continuously from a roll supply and adhered to the back of a single or multiple display card, utilizing equipment of a relatively simplified nature, which may be made available to the display card supplier on a reasonable and economical basis. Additionally, the supply of thermoplastic film is tensilized to be heat-shrinkable in the longitudinal direction, without significant change in width dimension, since the use of such film facilitates the initial preparation of the display cards. However, where desirable and appropriate, non-tensilized film may be utilized in a manner providing for either no initial loop or an initial loop of dimensions less than adequate to receive the display article, after which the loop is distended under heat and temporarily set in distended condition, pending subsequent reheating and shrinking into taut relation about the display article.

One of the particularly advantageous features of the present invention resides in the formation at the front of the display card of an open-ended loop of heat-shrinkable thermoplastic film, the initial dimensions of the loop being such as to freely accommodate endwise insertion of a display article along the front of the card and into a position embraced by the loop, the loop being thereafter brought into heat-shrunk-taut relation with the display article. Endwise insertion of the display article into the open-ended loop, usually advantageously held open by atmospheric action (e.g., a vacuum), is especially compatible with contemporary product loading facilities associated with modern product filling and packaging lines.

As will be understood by reference to the various described forms of the invention, which are intended to be illustrative examples only, the fundamental concepts of the invention may be embodied in an extremely wide variety of packaging applications, adaptable with minimum expense and difficulty to provide optimum display packaging for an endless variety of display articles. In this connection, with small dimensional alterations, the display package of the invention can be arranged to permit or prevent inspection of the contents of a display article, such as a lipstick case, perfume bottle, or the like. While the display package of the present invention, in certain of its forms, may take advantage of the inventive concepts of my prior United States Patent No. 3,018,879, other aspects of the present invention, particularly in regard to endwise loading of the product into an open-ended loop along the front of the display card, represent a significant and advantageous departure from my prior inventions.

Since various changes may be made in the packages and procedures specifically described herein, without departing from the clear teachings of the disclosure, reference should be made to the following appended claims in determining the full scope of the invention.

I claim:
1. The method of packaging products for display which comprises
   (a) supplying display cards provided with an aperture of predetermined length,
   (b) securing to the back surface of the card a length of heat-shrinkable film of a width not significantly greater than the length of said aperture,
   (c) projecting a loop-forming portion of said film through the aperture to the front of the card to form an open-ended loop having a loop circumference of adequate dimensions to accommodate the unrestricted endwise insertion of a display product into said loop,
   (d) inserting a display product along the front of the card and into an open end of the film loop until the loop substantially embraces the product,
   (e) said product having a size and shape incompatible with passage through said aperture when the product is embraced by said loop, and
   (f) heat shrinking said loop to reduce the loop circumference dimensions and thereby draw said product firmly against the front of said card.
2. The method of claim 1, in which
   (a) said film is secured across the entire width of the back of said card, except in the area of said aperture.
3. The method of claim 1, in which
   (a) the entire section of film secured to a card and forming said loop is oriented for heat-shrinking properties, and
   (b) said loop forming portion is selectively heat-shrunk about the product.
4. The method of claim 1, in which
   (a) a film is initially secured in a generally flat condition to the back of the card, and
   (b) the portion of the film which spans the aperture is distended through the aperture in the presence of heat to form an open-ended, heat-shrinkable loop at the front of the card.
5. The method of packaging products for display, which comprises
   (a) supplying a display card having an aperture therein,
   (b) securing a thermoplastic film to the back of the card on the two opposite sides only of said aperture,
   (c) projecting a free portion of the film through the aperture to form in front of said card, a heat-shrinkable, open-ended film loop having a loop circumference dimension adequate to accommodate the unrestricted endwise insertion of a display product into said loop,
   (d) inserting a product along the front of the card and into an open end of said loop, and
   (e) reducing the loop circumference dimension, and thereby shrinking the loop about the product, by the application of heat.
6. The method of claim 5, in which
   (a) said film is flexible and non-self-sustaining as to form, and
   (b) said loop is opened by the action of air pressures prior to insertion of said product.
7. The method of claim 5, in which
   (a) said product has a length less by a predetermined amount than the width of the loop-forming portion of said film,
   (b) the product is inserted into said loop to a position in which portions of the loop overhang both ends of the product, and
   (c) the overhanging portions of said film are shrunk over end areas of the product.
8. The method of claim 5, in which

11

(a) said product is inserted to a position in which at least one end of the loop-forming portion overhangs an end of the product, and
(b) the overhanging portions of the film are shrunk over an end area of the product.

9. The method of packaging products for display, which comprises
(a) supplying a display card having an opening therein,
(b) securing a thermoplastic film to the back of the card,
(c) projecting a heat-shrinkable portion of said film through said opening and forming an open-ended loop having a loop circumference dimension adequate to accommodate the unrestricted endwise insertion of a display product into said loop,
(d) positioning a product within the heat-shrinkable loop with a portion of the product exposed at said open end, and
(e) securing the product to the card by heat-shrinking said loop to reduce its loop circumference dimension.

10. The method of claim 9, in which
(a) the product is positioned in the loop by advancing the product along the front of the card and into an open end of the loop.

11. The method of claim 9, in which
(a) the opening in the card is of a size and shape relative to the product as to receive the product with a substantial portion projecting backward beyond the back surface of the card,
(b) said lop embracing forward projecting portions of the product.

12. The method of preparing a package for supporting products for display, which comprises
(a) supplying a display card having an opening,
(b) securing a portion of a thermoplastic film to the back of the card on one side of the opening,
(c) projecting a heat-shrinkable, loop-forming portion of the film through the opening to form, on the front side of the card, an open-ended loop having a loop circumference dimension adequate to accommodate the unrestricted endwise insertion of a display product into said loop, and
(d) securing a second portion of the film to the back of the card on the opposite side of said opening.

13. A display package comprising
(a) a display card having an opening,
(b) a display product positioned on the card generally in the region of said opening and with at least a portion of the product projecting forward of the opening, and
(c) a strip of thermoplastic film secured to the back of the card and having an open-ended, loop-forming portion extending through the opening and embracing the product,
(d) at least the loop-forming portion of the film being in a heat-shrunk-taut condition to secure the product tightly to the front face of the card, said loop-forming portion being of re-formed configuration and having a smaller loop circumference than prior to re-formation.

14. The display package of claim 13, in which
(a) the thermoplastic film is in the form of a tensilized web,
(b) the width of the web being not substantially greater than the length of the card opening.

15. The display package of claim 13, in which
(a) the display card includes a plurality of product positioning openings aligned in side-by-side relation, and
(b) the thermoplastic film is in the form of a web disposed across and secured to the back of the card and having open-ended, loop-forming portions projecting through each of the plurality of side-by-side openings,

12

(c) a display product being positioned at each of the openings and within a loop-forming film portion,
(d) each of the loop-forming portions being in a heat-shrunk-taut condition, and
(e) each of said loop-forming portions being of re-formed configuration and having a smaller loop circumference than prior to re-formation.

16. The display package of claim 13, in which
(a) the film strip is bonded to the back of the card from one edge to the other exclusive of the area of the opening.

17. The display package of claim 13, in which
(a) the display product is a lipstick or the like having a two-part case,
(b) the loop-forming portion of the film embraces only one part of said two-part case, and
(c) said card, film and case are so oriented and arranged as to accommodate removal of the other part of the case.

18. The display package of claim 13, in which
(a) the width of the film at said loop-forming portion is greater than the length of the product,
(b) the product being so positioned relative to the film as to provide overhanging film portions at each end of the product, and
(c) said overhanging film portions being in a heat-shrunk condition to partly close the open ends of the film loop.

19. The display package of claim 13, in which
(a) the display product is of varying cross-section, and
(b) the loop-forming portion of the film embraces the product in regions of different cross-section, whereby to prevent removal of the product without destruction of the card and/or film loop.

20. A display package comprising
(a) a display card having an opening within its borders,
(b) a strip of thermoplastic film adhered across the back of the card at right angles to the principal axis of the opening,
(c) the width of the film strip being not substantially greater than the length of the opening,
(d) a portion of the film strip intermediate its ends projecting through the card opening and forming an open-ended loop, and
(e) a display product received within the embrace of the film loop and having portions exposed at the open ends of the loop,
(f) said loop being in a heat-shrunk-taut condition and holding said product tightly against the front of the display card,
(g) said film loop being of re-formed configuration and having a smaller loop circumference than prior to re-formation.

21. The display package of claim 20, in which
(a) the display product has a length greater than the width of the film strip.

22. The display package of claim 20, in which
(a) the display card opening is of such size and shape relative to the product as to receive the produce with parts thereof projecting on both sides of the display card,
(b) the product being retained in the heat-shrunk-taut loop at least in part by edges of the card defining said opening.

23. The display package of claim 20, in which
(a) at least one edge extremity of the display product is substantially aligned with an edge extremity of the card.

24. The display package of claim 23, in which
(a) a side edge extremity of the product is substantially aligned with a side edge extremity of the card,
(b) the side edges of the card opening are located inward of the side edges of the card, and
(c) the film loop embraces the display product about an area of greater than 180 degrees.

25. A display card assembly especially adapted for use in making the display package of claim 20 and constituting a material part thereof, which comprises
   (a) a display card having a product positioning opening within its borders, and
   (b) a strip of heat-shrinkable film adhered across the back of the card and having a heat-shrinkable, loop-forming portion between its ends and projected through the opening,
   (c) the width of the strip being not substantially greater than the length of the opening,
   (d) said loop-forming portion having a loop circumference dimension adequate to accommodate the unrestricted endwise insertion of a display article into said loop,
   (e) said loop-forming portion being re-formable under heat to have a sufficiently smaller loop circumference dimension to cause the re-formed loop-forming portion to tightly embrace a display article.

26. The display card assembly of claim 25, in which
   (a) the film is prestretched throughout in the length direction only, whereby the width of the loop-forming portion of the film is not substantially affected by the heat-shrinkage characteristics thereof.

27. The display card assembly of claim 25, in which
   (a) the card opening is of a size and shape to partly receive the intended product,
   (b) the circumference dimensions of the loop-forming portion are such relative to the intended product as to accommodate end-wise insertion of the product into the loop along the front of the card, and
   (c) the shrinkage characteristics of the loop-forming portion are such as to enable the product to be embraced by taut film when the product is partly received in said opening.

28. A display card assembly according to claim 25, in which
   (a) the card has a foldable tab-like portion at one end of the card opening,
   (b) said tab-like portion being foldable out of the plane of the card to form an end wall for supporting a display product.

29. A display card assembly especially adapted for use in making a display package, comprising
   (a) a display card having a product positioning opening within its borders, and
   (b) a strip of heat-shrinkable film adhered across the back of the card and having a heat-shrinkable. loop-forming portion between its ends and projected through the opening.
   (c) the width of the strip being not substantially greater than the length of the opening,
   (d) the loop-forming portion having a circumferential dimension to accommodate the unrestricted end-wise insertion of a product into the loop along the front of the card,
   (e) said loop-forming portion being re-formable under heat to have a sufficiently smaller loop circumference dimension to cause the re-formed loop-forming portion to tightly embrace a display article.

30. The display card assembly of claim 29, in which
   (a) the assembly initially includes a plurality of card sections connected edge-to-edge,
   (b) the film is adhered in a single length across the backs of the connected card sections, with loop-forming portions projecting through openings in each card section,
   (c) said card sections and film length being adapted for subdivision into individual display card assemblies, each to contain a display product.

References Cited by the Examiner

UNITED STATES PATENTS

| 1,245,805 | 11/1917 | Schneider | 206—80 |
| 3,075,330 | 1/1963 | Swezey. | |
| 3,076,542 | 2/1963 | Lowry et al. | 206—78 |
| 3,088,587 | 5/1963 | Dimmig, et al. | 206—56 |
| 3,139,182 | 6/1964 | Edell | 206—78 |

FOREIGN PATENTS

| 907,394 | 6/1945 | France. |
| 335,442 | 2/1959 | Switzerland. |

THERON E. CONDON, *Primary Examiner.*
WILLIAM T. DIXSON, JR., *Examiner.*